(12) United States Patent
Merlau et al.

(10) Patent No.: US 10,082,004 B2
(45) Date of Patent: Sep. 25, 2018

(54) DOWNHOLE POWER GENERATOR

(71) Applicant: SCHLUMBERGER TECHNOLOGY CORPORATION, Sugar Land, TX (US)

(72) Inventors: David Merlau, Friendswood, TX (US); Edgar Jose Montiel, Richmond, TX (US)

(73) Assignee: SCHLUMBERGER TECHNOLOGY CORPORATION, Sugar Land, TX (US)

(*) Notice: Subject to any disclaimer, the term of this patent is extended or adjusted under 35 U.S.C. 154(b) by 110 days.

(21) Appl. No.: 14/965,081

(22) Filed: Dec. 10, 2015

(65) Prior Publication Data

US 2016/0168958 A1    Jun. 16, 2016

Related U.S. Application Data

(60) Provisional application No. 62/090,966, filed on Dec. 12, 2014.

(51) Int. Cl.
*E21B 41/00* (2006.01)
*H02K 35/02* (2006.01)

(52) U.S. Cl.
CPC ......... *E21B 41/0085* (2013.01); *H02K 35/02* (2013.01)

(58) Field of Classification Search
CPC ................................................. E21B 41/0085
See application file for complete search history.

(56) References Cited

U.S. PATENT DOCUMENTS

| | | | |
|---|---|---|---|
| 3,666,030 A * | 5/1972 | Bohn | E21B 41/0085 166/55.1 |
| 5,149,984 A | 9/1992 | Schultz et al. | |
| 5,238,070 A | 8/1993 | Schultz et al. | |
| 5,839,508 A | 11/1998 | Tubel et al. | |
| 5,965,964 A | 10/1999 | Skinner et al. | |
| 6,717,283 B2 | 4/2004 | Skinner et al. | |
| 9,528,349 B2 * | 12/2016 | Zimmerman | E21B 41/0085 |
| 2010/0319934 A1 | 12/2010 | Ervin | |
| 2011/0148656 A1 | 6/2011 | Hudson et al. | |
| 2013/0223670 A1 | 8/2013 | Kim et al. | |
| 2013/0341057 A1 | 12/2013 | Moore | |
| 2014/0049051 A1 | 2/2014 | Burke | |
| 2014/0265580 A1 | 9/2014 | Cooley et al. | |

OTHER PUBLICATIONS

International Search Report issued in related PCT application PCT/US2015/065148 dated Mar. 25, 2016, 3 pages.
International Preliminary Report on Patentability issued in the related PCT Application PCT/US2015/065148 dated Jun. 22, 2017 (10 pages).

* cited by examiner

*Primary Examiner* — Giovanna Collins Wright
*Assistant Examiner* — Yanick A Akaragwe

(57) ABSTRACT

A downhole tool includes a housing. A magnet, an inductor, and a piston are positioned within the housing. The piston moves from a first position to a second position in response to a pressure of a fluid in the housing increasing. A distance between the magnet and the inductor varies when the piston moves, thereby causing the inductor to generate power.

15 Claims, 3 Drawing Sheets

DOWNHOLE POWER GENERATOR

CROSS-REFERENCE TO RELATED APPLICATIONS

This application claims the benefit of a related U.S. Provisional Patent Application having Ser. No. 62/090,966, filed Dec. 12, 2014, titled "Downhole Power Generator," to David Merlau et al., the disclosure of which is incorporated by reference herein in its entirety.

BACKGROUND

A downhole tool oftentimes includes a localized power source (e.g., a battery) for providing power to the downhole tool when the downhole tool is in a wellbore. One commonly used battery is a lithium battery; however, lithium batteries tend to overheat at temperatures greater than or equal to about 200° C. Atomic batteries may also be used downhole; however, atomic batteries do not function well below a predetermined temperature (i.e., they work best at very high temperatures).

Rather than using batteries downhole, some downhole tools generate power downhole. For example, the downhole tool may include a turbine, and an operator at the surface may pump fluid downhole that causes the turbine to rotate. The downhole tool may also include a generator that generates power in response to the rotation of the turbine.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

A downhole tool is disclosed. The downhole tool includes a housing. A magnet, an inductor, and a piston are positioned within the housing. The piston moves from a first position to a second position in response to a pressure of a fluid in the housing increasing. A distance between the magnet and the inductor varies when the piston moves, thereby causing the inductor to generate power.

In another embodiment, the downhole tool includes a housing having an opening formed radially-therethrough. The opening places a wellbore annulus in fluid communication with an internal volume of the housing. First and second inductors are positioned within the internal volume. The first and second inductors are stationary with respect to the housing. A magnet is positioned within the internal volume and axially-between the first and second inductors. A piston is positioned within the internal volume. The magnet is coupled to and moves together with the piston in response to a pressure of a fluid in the internal volume increasing. A distance between the first inductor and the magnet increases in response to the movement of the piston, thereby causing the first inductor to generate power. A distance between the second inductor and the magnet decreases in response to the movement of the piston, thereby causing the second inductor to generate additional power.

A method for generating power in a downhole tool is also disclosed. The method includes running the downhole tool into a wellbore. The method also includes increasing a pressure of a fluid in a wellbore annulus. A piston in the downhole tool moves from a first position to a second position in response to the increased pressure, causing a distance between an inductor and a magnet to increase, thereby causing the inductor to generate power.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures.

DETAILED DESCRIPTION

Reference will now be made in detail to embodiments, examples of which are illustrated in the accompanying drawings and figures. In the following detailed description, numerous specific details are set forth in order to provide a thorough understanding of the present disclosure. However, it will be apparent to one of ordinary skill in the art that the system and method disclosed herein may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first object could be termed a second object, and, similarly, a second object could be termed a first object, without departing from the scope of the present disclosure. The first object and the second object are both objects, but they are not to be considered the same object.

The terminology used in the description herein is for the purpose of describing particular embodiments only and is not intended to be limiting of the invention. As used in the description of the invention and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Attention is now directed to processing procedures, methods, techniques, and workflows that are in accordance with some embodiments. Some operations in the processing procedures, methods, techniques, and workflows disclosed herein may be combined and/or the order of some operations may be changed.

Figure 1:
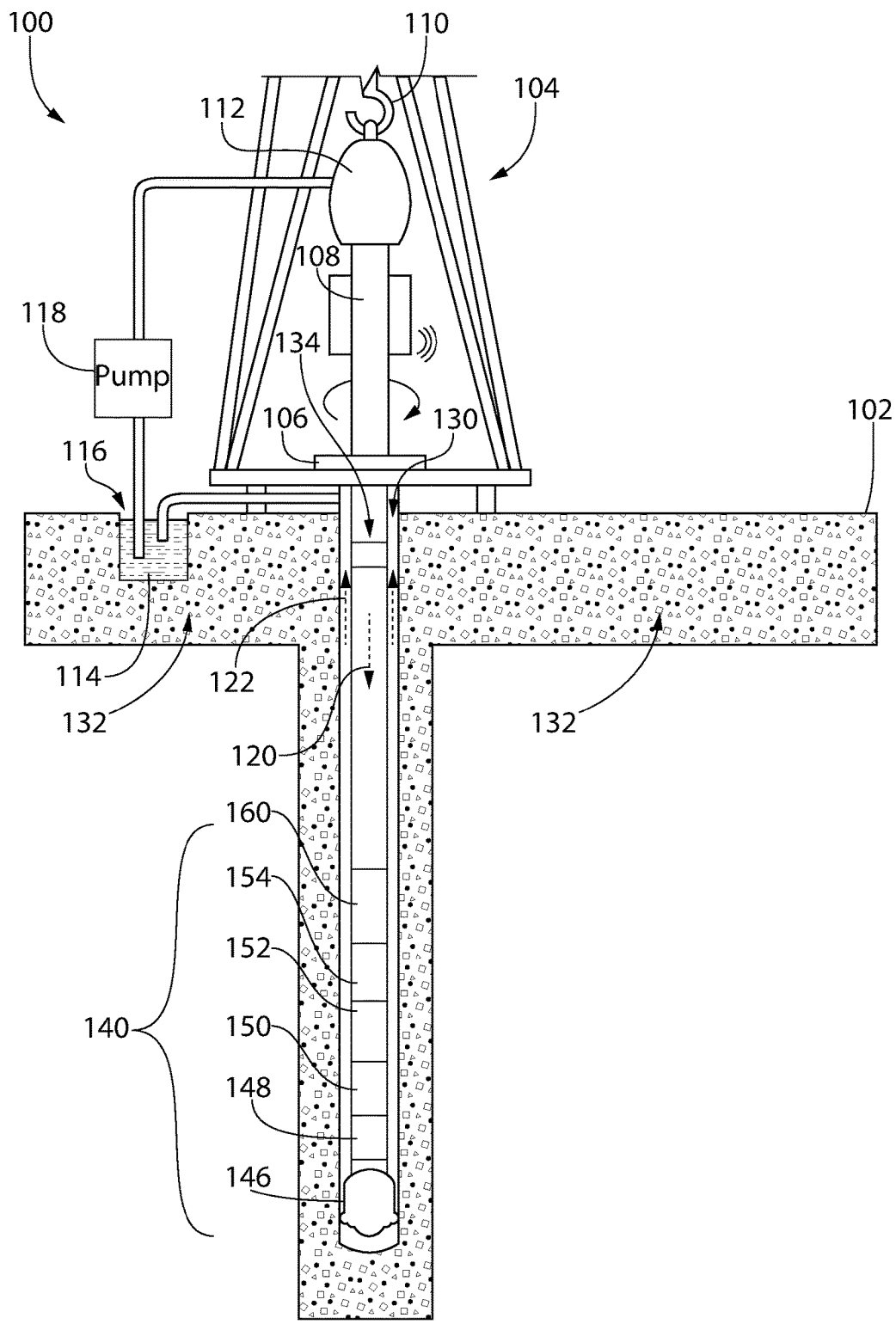
FIG. 1 illustrates a cross-sectional view of a well site system, according to an embodiment.

FIG. 1 illustrates a cross-sectional view of a well site system 100, according to an embodiment. The well site system 100 may include a platform and derrick assembly 104 positioned over a wellbore 130 that is formed in a subterranean formation 132. The platform and derrick assembly 104 may include a rotary table 106, a kelly or top drive 108, a hook 110, and a rotary swivel 112. A tubing string 134 may be supported by the hook 110 and extend down into the wellbore 130. The tubing string 134 may include a body that is a hollow, metallic tubular member. The rotary table 106 may generate rotary motion that is transmitted through the kelly or top drive 108 to the tubing string 134, causing the tubing string 134 to rotate within the wellbore 130. The swivel 112 may allow the tubing string 134 to rotate with respect to the hook 110.

A downhole tool 140 may be coupled to a lower end of the tubing string 134. The downhole tool 140 may be or include a bottom hole assembly ("BHA"). The downhole tool 140 may include the drill bit 146, a rotary steerable system ("RSS") 148, and a motor 150. The downhole tool 140 may also include a logging-while-drilling ("LWD") tool 152 and a measurement-while-drilling ("MWD") tool 154. The LWD tool 152 may be configured to measure one or more formation properties and/or physical properties as the wellbore 130 is being drilled or at any time thereafter. The MWD tool 154 may be configured to measure one or more physical properties as the wellbore 130 is being drilled or at any time thereafter. The formation properties may include resistivity, density, porosity, sonic velocity, gamma rays, and the like. The physical properties may include pressure, temperature, wellbore caliper, wellbore trajectory, a weight-on-bit, torque-on-bit, vibration, shock, stick slip, and the like.

The downhole tool 140 may also include a testing valve 155, a circulating valve 156, a gauge 157, a wireless telemetry router 158, or the like. In one example, the testing valve 155 is used to pressure-test the tubing string 134 while running in-hole. In another embodiment, the testing valve 155 may be used to control formation flows and shut-ins. The circulating valve 156 may enable circulation through the tubing string 134 and the annulus. The circulating valve 156 may be used to circulate fluid for well kickoff or kill. The gauge 157 may be a pressure gauge that is used to measure and record pressure downhole. The measurements from the LWD 152, the MWD 154, the testing valve 155, the circulating valve 156, and/or the gauge 157 may be transmitted to the surface using the telemetry router 158.

The downhole tool 140 may also include a power generation module 160. The power generation module 160 may be configured to generate power that may be used by the downhole tool 140 when the downhole tool 140 is in the wellbore 130. For example, the power may be used by the RSS 148, the LWD tool 152, the MWD tool 154, the testing valve 155, the circulating valve 156, gauge 157, the telemetry router 158, or a combination thereof.

Figure 2:
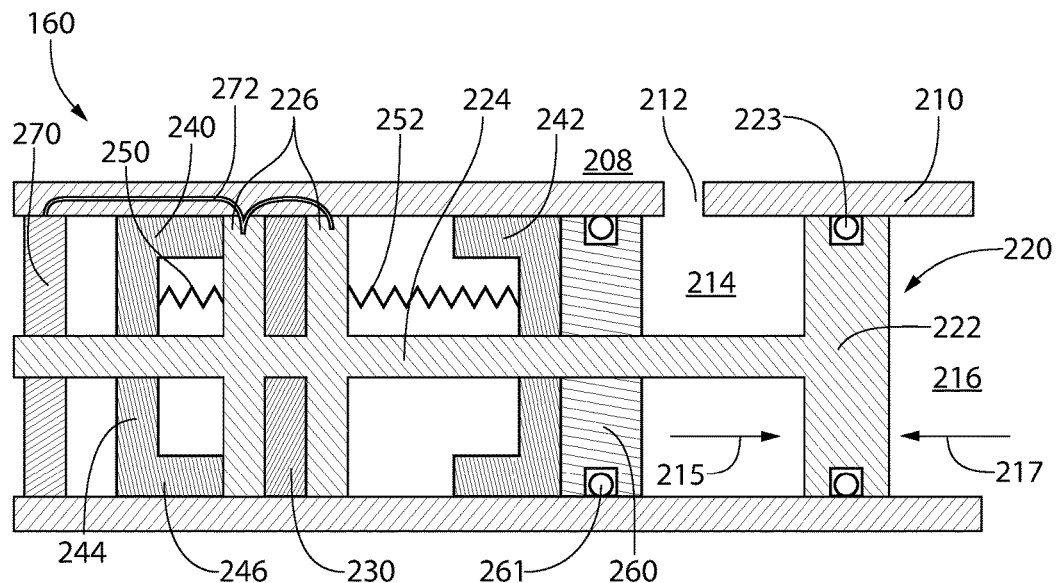
FIG. 2 illustrates a cross-sectional view of a power generation module in a first position, according to an embodiment.

FIG. 2 illustrates a cross-sectional view of the power generation module 160 in a first position, according to an embodiment. The power generation module 160 may include a housing 210. The housing 210 may be a tubular member that defines an interior volume. One or more openings (one is shown: 212) may be formed radially-through the housing 210. The opening 212 may provide a path of fluid communication between a wellbore annulus 208 and the interior volume 214 of the housing 210. The wellbore annulus 208 may be formed between the outer surface of the housing 210 and/or downhole tool 140 on one side and the wall of the wellbore 130 (FIG. 1) on the other side.

A piston 220 may be positioned within the internal volume of the housing 210. The piston 220 may include a body 222, a shaft 224, and a head 226. The body 222 may extend radially-outward from the shaft 224 and into contact with an inner surface of the housing 210. A sealing member 223 may be positioned around the outer surface of the body 222. The sealing member 223 may create a fluid-tight seal between the body 222 and the housing 210. The sealing member 223 may be an elastomeric O-ring. As such, the body 222 may separate the internal volume into a first portion 214 and a second portion 216. The first portion 214 may be in fluid communication with the wellbore annulus 208 via the opening 212 in the housing 210. The second portion 216 may have a pressurized gas, a biasing member, etc. disposed therein, as discussed below.

Although not shown, one or more openings may be formed axially-through the body 222 to provide a path of fluid communication between the first and second portions 214, 216 of the internal volume. In some embodiments, flow restrictors may be positioned in the openings. When the flow restrictors are used, the pressurized gas, biasing member, etc. in the second portion 216 of the interior volume may be omitted. Instead, the transient pressure may facilitate the shifting of the piston 220 in both directions. First, a rapid pressure increase pushes the piston 220 to the in a first axial direction (e.g., to the right). After maintaining that same pressure for a predetermined amount of time, the pressure would equalize across the piston 220. Upon removal of the applied annulus pressure, the pressure behind the piston 220 would shift the piston 220 in a second, opposing axial direction (e.g., to the left), and the pressure would again equalize, returning to the original condition.

The body 222 may be positioned on a first axial side of the opening 212 in the housing 210. The shaft 224 may be coupled to and extend between the body 222 and the head 226. The head 226 may be positioned on a second axial side of the opening 212 in the housing 210. As shown, the body 222 is below the opening 212, and the head 226 is above the opening 212. The head 226 may extend radially-outward from the shaft 224.

One or more inductors (one is shown: 230) may be coupled to the piston 220. As shown, the inductor 230 may be positioned within the head 226 of the piston 220. The piston 220 and the inductor 230 may be configured to move together with respect to the housing 210.

One or more magnets (two are shown: 240, 242) may be positioned within the internal volume of the housing 210. As shown, a first magnet 240 may be positioned on a first axial side of the head 226 of the piston 220, and a second magnet 242 may be positioned on a second axial side of the head 226 of the piston 220. Each magnet 240, 242 may have a radially-extending portion 244 and an axially-extending portion 246. As shown, the radially-extending portion 244 may extend radially-outward from a central longitudinal axis of the housing 210 to the inner surface of the housing 210. The axially-extending portion 246 may extend axially from the radially-extending portion 244 toward the head 226 of the piston 220. The magnets 240, 242 may be stationary with respect to the housing 210. For example, the axially-extending portions 246 of the magnets 240, 242 may be coupled to the inner surface of the housing 210.

One or more biasing members (two are shown: 250, 252) may be positioned within the internal volume of the housing 210. As shown, a first biasing member 250 may be positioned axially-between the first magnet 240 and the head 226 of the piston 220, and a second biasing member 252 may be positioned axially-between the second magnet 242 and the head 226 of the piston 220. The biasing members 250, 252 may be configured to exert an axial force on the piston 220. In one embodiment, the biasing members 250, 252 may be springs.

In at least one embodiment, a stationary member 260 may be positioned within the internal volume of the housing 210. The stationary member 260 may be coupled to the housing 210 such that the stationary member 260 is stationary with respect to the housing 210. The stationary member 260 may be positioned axially-between the body 222 of the piston 220 and the head 226 of the piston 220. The stationary member 260 may also be positioned axially-between the second magnet 242 and the opening 212 in the housing 210. The stationary member 260 may extend radially-outward from the shaft 224 to the inner surface of the housing 210. A sealing member 261 may be positioned around the outer surface of the stationary member 260. The sealing member 261 may create a fluid-tight seal between the stationary member 260 and the housing 210. The sealing member 261 may be an elastomeric O-ring.

An energy storage device 270 may also be positioned within the internal volume of the housing 210. The energy storage device 270 may be or include one or more batteries, capacitors, or a combination thereof. The energy storage device 270 may be configured to store the energy generated by the inductor 130 when a distance between the inductor 230 and the magnets 240, 242 varies, as discussed in greater detail below. The energy may be transmitted from the inductor 230 to the energy storage device 270 through one or more wires 272.

In operation, the downhole tool 140 may be run into the wellbore 130. The power generation module 160 may be in the first position when the downhole tool 140 is run into the wellbore 130. Once the downhole tool 140 is in the wellbore 130, a user may cause a pressure of a fluid in the wellbore annulus 208 to increase. The pressure increase may be caused by a user at the surface increasing the volumetric flow rate of fluid (e.g., drilling mud) being pumped into the wellbore 130. The pressure of the fluid may be increased from about one minute to about three minutes. The pressure of the fluid may increase by about 500 psi or more.

The increased pressure of the fluid may be communicated from the wellbore annulus 208, through the opening 212 in the housing 210, and into the first portion 214 of the internal volume of the housing 210. The increased pressure may exert a force on a first axial side of the body 222 of the piston 220 in a direction shown by arrow 215. An opposing force may be exerted on a second axial side of the body 222 of the piston in a direction shown by arrow 217. The opposing force may be caused by a pressurized gas, a biasing member (e.g., a spring), disposed within the second portion 216 of the internal volume. When the force caused by the increased pressure (e.g., in the direction 215) becomes greater than the opposing force (e.g., in the direction 217), the piston 220 may move within the internal volume of the housing 210 (e.g., in the direction 215). This may actuate the power generation module 160 into a second position.

Figure 3:
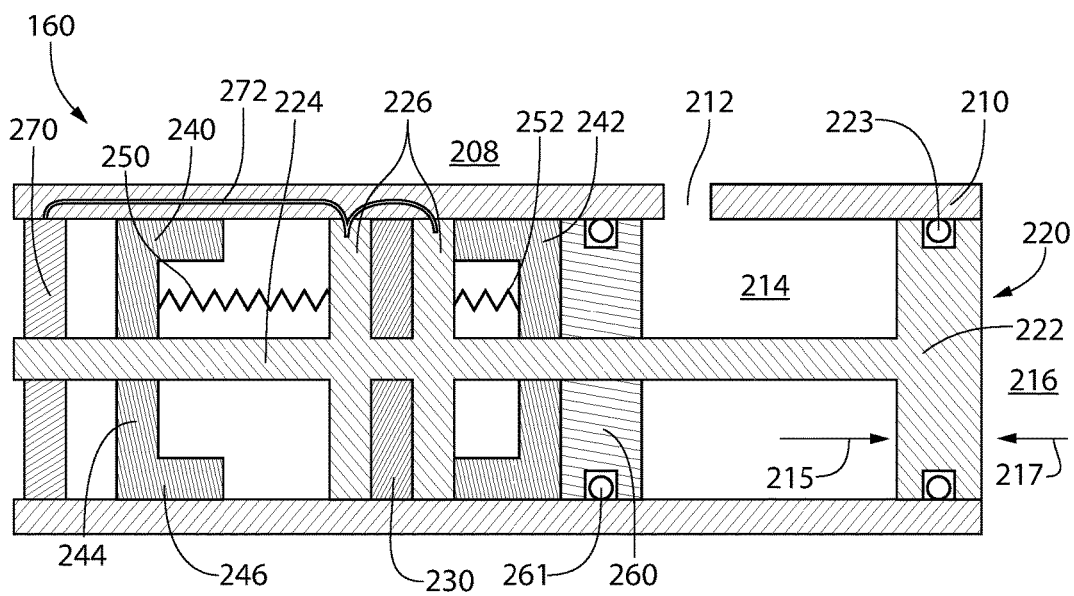
FIG. 3 illustrates a cross-sectional view of the power generation module in a second position, according to an embodiment.

FIG. 3 illustrates a cross-sectional view of the power generation module 160 in the second position, according to an embodiment. The inductor 230 may move together with the piston 220 (e.g., in the direction 215). As the inductor 230 moves away from the first magnet 240, the magnetic field experienced by the inductor 230 due to the first magnet 240 varies (e.g., decreases). This may generate power in the inductor 230. Furthermore, as the inductor 230 moves toward the second magnet 242, the magnetic field experienced by the inductor 230 due to the second magnet 242 varies (e.g., increases). This may also generate power in the inductor 230.

The amount of power generated in the inductor 230 may be proportional to the speed at which the inductor 230 moves with respect to the magnetic field(s). The biasing member 250 may increase the speed at which the inductor 230 moves in the direction 215. For example, once the force caused by the increased pressure (e.g., in the direction 215) becomes greater than the opposing force (e.g., in the direction 217), and the piston 220 and the inductor 230 begins moving in the direction 215, the biasing member 250 may exert additional force in the direction 215, thereby increasing the speed at which the piston 220 and 230 move. In at least one embodiment, the power generation module 160 may generate from about 1 joule to about 10 joules or more each time the power generation module 160 actuates from the first position to the second position.

The user may cause the pressure of the fluid in the wellbore annulus 208 to decrease in pressure a predetermined amount of time after the user caused the pressure of the fluid in the wellbore annulus 208 to increase. As noted above, the predetermined amount of time may be from about 1 minute to 5 minutes. The pressure of the fluid may decrease by about 500 psi.

The decreased pressure of the fluid may be communicated from the wellbore annulus 208, through the opening 212 in the housing 210, and into the first portion 214 of the internal volume of the housing 210. When the force caused by the pressure communicated through the opening 212 in the housing (e.g., in the direction 215) becomes less than the opposing force (e.g., in the direction 217), the piston 220 may move within the internal volume of the housing 210 (e.g., in the direction 217). This may actuate the power generation module 160 back into the first position, as shown in FIG. 2.

As noted above, the inductor 230 may move together with the piston 220 (e.g., in the direction 217). As the inductor 230 moves away from the second magnet 242, the magnetic field experienced by the inductor 230 due to the second magnet 242 varies (e.g., decreases). This may generate power in the inductor 230. Furthermore, as the inductor 230 moves toward the first magnet 240, the magnetic field experienced by the inductor 230 due to the first magnet 240 varies (e.g., increases). This may also generate power in the inductor 230.

The biasing member 252 may increase the speed at which the inductor 230 moves in the direction 217. For example, once the force caused by the increased pressure (e.g., in the direction 215) becomes less than the opposing force (e.g., in the direction 217), and the piston 220 and the inductor 230 begin moving in the direction 217, the biasing member 252 may exert additional force in the direction 217, thereby increasing the speed at which the piston 220 and the inductor 230 move. The power generated in the inductor 230 may be transmitted to the energy storage device 270. The power in the energy storage device 270 may be supplied to any of the components discussed above (e.g., the RSS 148, the LWD tool 152, the MWD tool 154, the testing valve 155, the circulating valve 156, gauge 157, the telemetry router 158, etc.). In one particular example, the power may be used to obtain pressure readings from within the wellbore 130 after a prescribed shut-in in a downhole valve.

Figure 4:
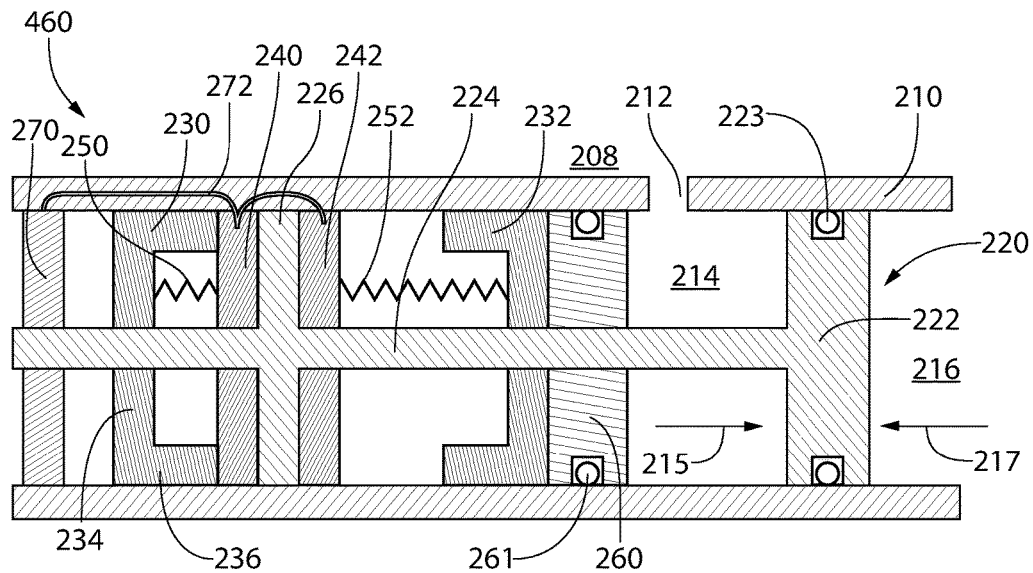
FIG. 4 illustrates a cross-sectional view of another power generation module in a first position, according to an embodiment.
Figure 5:
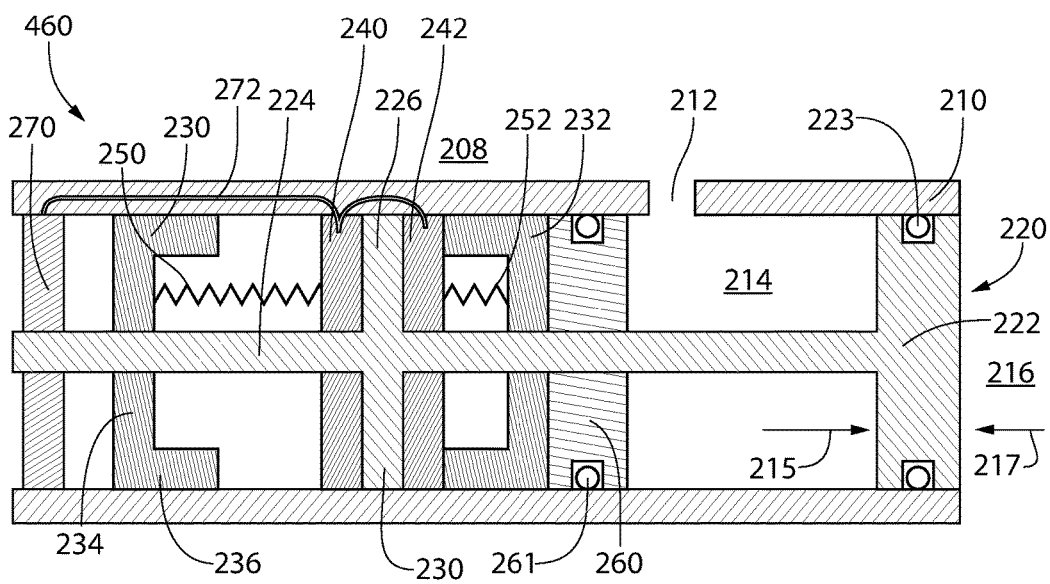
FIG. 5 illustrates a cross-sectional view of the power generation module of FIG. 4 in a second position, according to an embodiment.

FIG. 4 illustrates a cross-sectional view of another power generation module 160 in a first position, and FIG. 5 illustrates a cross-sectional view of the power generation module 160 in a second position, according to an embodiment. The power generation module 460 in FIG. 4 may be similar to the power generation module 160 in FIGS. 2 and 3, and similar reference numbers are used where applicable. The power generation module 460 may include one or more inductors (two are shown: 230, 232). As shown, a first inductor 230 may be positioned on a first axial side of the head 226 of the piston 220, and a second inductor 232 may be positioned on a second axial side of the head 226 of the piston 220. Each inductor 230, 232 may have a radially-extending portion 234 and an axially-extending portion 236. As shown, the radially-extending portion 234 may extend radially-outward from a central longitudinal axis of the housing 210 to the inner surface of the housing 210. The axially-extending portion 236 may extend axially from the radially-extending portion 234 toward the head 226 of the piston 220. The inductors 230, 232 may be stationary with respect to the housing 210. For example, the axially-extending portions 236 of the inductors 230, 232 may be coupled to the inner surface of the housing 210.

The power generation module 460 may also include one or more magnets (two are shown: 240, 242). The magnets 240, 242 may be coupled to the piston 220. For example, a first magnet 240 may be coupled to a first axial side of the head 226, and a second magnet 242 may be coupled to a second axial side of the head 226. The magnets 240, 242 may be configured to move together with the piston 220.

When the piston 220 actuates from the first position to the second position, the magnets 240, 242 may move together with the piston 220 (e.g., in the direction 215). As the first magnet 240 moves away from the first inductor 230, the magnetic field experienced by the first inductor 230 due to the first magnet 240 varies (e.g., decreases). This may generate power in the first inductor 230. Furthermore, as the second inductor 232 moves toward the second magnet 242, the magnetic field experienced by the second inductor 232 due to the second magnet 242 varies (e.g., increases). This may also generate power in the inductor 232.

Similarly, when the piston 220 actuates from the second position back to the first position, the magnets 240, 242 may move together with the piston 220 (e.g., in the direction 217). As the first magnet 240 moves toward the first inductor 230, the magnetic field experienced by the first inductor 230 due to the first magnet 240 varies (e.g., increases). This may generate power in the first inductor 230. Furthermore, as the second inductor 232 moves away from the second magnet 242, the magnetic field experienced by the second inductor 232 due to the second magnet 242 varies (e.g., decreases). This may also generate power in the inductor 2

Although a single power generation module 160, 460 is shown in each embodiment, it will be appreciated that the downhole tool 140 may include more than one power generation module 160, 460 to increase the amount of power generated. For example, the downhole tool 140 may include multiple power generation modules 160, 460 in series. The multiple power generation modules 160, 460 may each share a common piston 220, or they may each include their own piston 220.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. Moreover, the order in which the elements of the methods described herein are illustrate and described may be re-arranged, and/or two or more elements may occur simultaneously. The embodiments were chosen and described in order to best explain the principals of the invention and its practical applications, to thereby enable others skilled in the art to best utilize the invention and various embodiments with various modifications as are suited to the particular use contemplated.

What is claimed is:

1. A downhole tool, comprising:
   a housing;
   a magnet positioned within the housing;
   an inductor positioned within the housing;
   a piston positioned within the housing;
   a first biasing member positioned axially above a piston; and
   a second biasing member positioned axially below the piston, wherein the first and second biasing members are configured to exert opposing forces on the piston, wherein the piston moves from a first position to a second position in response to a pressure of a fluid in the housing increasing, and wherein a distance between the magnet and the inductor varies when the piston moves, thereby causing the inductor to generate power.

2. The downhole tool of claim 1, wherein an opening is formed radially-through the housing, wherein the opening places a wellbore annulus in fluid communication with a first portion of an internal volume of the housing, and wherein the fluid is within the first portion of the internal volume.

3. The downhole tool of claim 2, wherein the fluid in the first portion of the internal volume exerts a force on a body of the piston in a first axial direction, wherein an opposing force is exerted on the body of the piston in a second axial direction, and wherein the piston moves from the first position to the second position when the force exerted by the fluid exceeds the opposing force.

4. The downhole tool of claim 3, wherein the body of the piston separates the first portion of the internal volume from a second portion of the internal volume, and wherein the opposing force is generated in the second portion of the internal volume.

5. The downhole tool of claim 3, further comprising a biasing member positioned within the housing, wherein the biasing member exerts additional force on the piston in the first axial direction.

6. The downhole tool of claim 3, wherein the piston further comprises a shaft that extends through the magnet, the inductor, or both.

7. The downhole tool of claim 6, wherein the magnet comprises a first magnet and a second magnet, and wherein the inductor is positioned axially-between the first and second magnets.

8. The downhole tool of claim 3, wherein the inductor is coupled to and moves with the piston, and wherein the magnet is stationary with respect to the housing.

9. The downhole tool of claim 3, wherein the magnet is coupled to and moves with the piston, and wherein the inductor is stationary with respect to the housing.

10. The downhole tool of claim 9, wherein the inductor comprises a first inductor and a second inductor, and wherein the magnet is positioned axially-between the first and second inductors.

11. A downhole tool, comprising:
  a housing having an opening formed radially-therethrough, wherein the opening places a wellbore annulus in fluid communication with an internal volume of the housing;
  a first inductor positioned within the internal volume;
  a second inductor positioned within the internal volume, wherein the first and second inductors are stationary with respect to the housing;
  a magnet positioned within the internal volume and axially-between the first and second inductors;
  a piston positioned within the internal volume;
  a first biasing member positioned between the first inductor and the piston; and
  a second biasing member positioned between the second inductor and the piston, wherein the first and second biasing members exert opposing forces on the piston, wherein the magnet is coupled to and moves together with the piston in response to a pressure of a fluid in the internal volume increasing, wherein a distance between the first inductor and the magnet increases in response to the movement of the piston, thereby causing the first inductor to generate power, and wherein a distance between the second inductor and the magnet decreases in response to the movement of the piston, thereby causing the second inductor to generate additional power.

12. The downhole tool of claim 11, wherein the first inductor comprises a first portion that extends radially-outward, and a second portion that extends axially from the first portion toward the magnet, wherein the first portion, second portion, and the piston define an interior space, and wherein one of the first or second biasing members is coupled to the inductor and the piston in the interior space.

13. The downhole tool of claim 11, wherein the piston comprises a body positioned on a first axial side of the opening, and a head positioned on a second axial side of the opening, wherein the magnet is coupled to the head.

14. The downhole tool of claim 13, wherein the piston further comprises a shaft that extends between the body and the head, wherein the shaft also extends through the second inductor.

15. A method for generating power in a downhole tool, comprising:
  running the downhole tool into a wellbore;
  increasing a pressure of a fluid in a wellbore annulus, wherein a piston in the downhole tool moves from a first position to a second position in response to the increased pressure, causing a distance between an inductor and a magnet to increase, thereby causing the inductor to generate power; and
  exerting additional forces onto the piston by a biasing member coupled between the piston and the housing to increase the speed at which the piston moves from the first position to the second position, wherein exerting additional forces onto the piston comprises exerting a first force with a first biasing member on a first side of the piston and exerting a second, opposing force with a second biasing member on a second side of the piston.

* * * * *